United States Patent [19]

Lipton et al.

[11] Patent Number: 4,988,025
[45] Date of Patent: Jan. 29, 1991

[54] SHOPPING CART ATTACHMENT

[75] Inventors: Jack B. Lipton; Pamela A. Hall, both of New York; Mario J. Morbelli, Jr., Rego Park, all of N.Y.

[73] Assignee: R. J. Reynolds Tobacco Company, Winston-Salem, N.C.

[21] Appl. No.: 450,887

[22] Filed: Dec. 14, 1989

[51] Int. Cl.⁵ .............................................. B60R 7/00
[52] U.S. Cl. .................................. 224/277; 364/710.04
[58] Field of Search ................... 224/277; 364/710.04, 364/710.07, 710.14, 405, 710.12; 340/706, 815.01, 815.3, 715, 711

[56] References Cited

U.S. PATENT DOCUMENTS

| D. 287,370 | 12/1986 | Stoll et al. | D18/7 |
|---|---|---|---|
| 1,819,755 | 8/1931 | Primos | 248/682 |
| 2,687,589 | 8/1954 | Brockway | 40/308 |
| 2,888,761 | 6/1959 | Miller | 40/308 |
| 2,895,243 | 7/1959 | Hummer et al. | 40/308 |
| 3,251,543 | 5/1966 | Bush et al. | 235/1 R |
| 3,288,478 | 11/1966 | Powers | 280/33.992 |
| 4,450,994 | 5/1984 | Holland | 206/425 |
| 4,496,058 | 1/1985 | Harris et al. | 206/557 |
| 4,512,504 | 4/1985 | Owlett | 224/42.46 R |
| 4,685,701 | 8/1987 | Amundson et al. | 281/42 |
| 4,777,484 | 10/1988 | Sakurai | 340/715 |
| 4,802,575 | 2/1989 | Martin | 206/425 |
| 4,892,192 | 1/1990 | Hague, Sr. et al. | 206/425 |
| 4,901,901 | 2/1990 | Reitenar | 224/277 |

Primary Examiner—Henry J. Recla
Assistant Examiner—Keith Kupferschmid
Attorney, Agent, or Firm—Grover M. Myers

[57] ABSTRACT

A shopping cart attachment includes an advertisement and a calculator including a display. The calculator displays a message related to the advertisment on the display, in response to a predetermined occurrence such as depression of the CLEAR key. Because the calculator displays the advertising message, it is difficult for the shopper to ignore the advertisement. A freestanding pocket or desktop calculator may also display a message related to an advertisement on its case or housing, in response to a predetermined occurrence.

12 Claims, 2 Drawing Sheets

SHOPPING CART ATTACHMENT

FIELD OF THE INVENTION

This invention relates to shopping cart attachments, and more particularly to a shopping cart attachment including a calculator.

BACKGROUND OF THE INVENTION

Shopping cart attachments are well known in the art. A shopping cart attachment is typically attached to the handlebar of a shopping cart, and includes one or more convenience aids for shoppers. Such shopping cart attachments also typically include an advertisement or a sign thereon. See for example U.S. Pat. No. 2,895,243 to Hummer et al. which discloses a shopping cart attachment including a sign. Shopping cart attachments may also include an electronic display which may display a different message as the shopping cart passes different locations in the store. The different displays may be provided by radio transmitters at the different locations in the store.

It is also known to provide a calculator in a shopping cart attachment so that the shopper can compute the cost of bulk items or compute a running total of the items being purchased. See for example U.S. Pat. No. 3,251,543 to Bush et al. in which a shopping cart attachment includes a store directory, an advertisement and a calculator. Other shopping cart attachments having calculators are disclosed in U.S. Pat. No. 4,512,504 to Owlett and U.S. Pat. No. 4,685,701 to Amundson et al.

When a shopping cart attachment includes an advertisement and a calculator, the shopper tends to ignore the advertisement. When the advertisement is ignored, the purpose of the shopping cart attachment is at least partially defeated. In particular, although the shopping cart attachment is provided by the merchant for the convenience of the shopper, it is also provided to expose the shopper to the advertising material contained thereon. Exposure to the advertisement is particularly important when the shopper is in the store in which the advertised item may be purchased. Since the customer tends to ignore the advertising on the shopping cart, this advertising medium has been underutilized.

SUMMARY OF THE INVENTION

It is therefore an object of the invention to provide an improved shopping cart attachment.

It is another object of the invention to provide an improved shopping cart attachment having a calculator thereon.

It is still another object of the invention to provide an improved shopping cart attachment having an advertisement and a calculator, the design of which makes it difficult for the shopper to ignore the advertisement.

These and other objects are provided according to the present invention by a shopping cart attachment which includes a substrate or housing including an advertisement and a calculator, with the calculator being adapted to display a message related to the advertisement in response to a predetermined occurrence, such as pressing the ENTER key or the expiration of a predetermined time during which a key is not depressed. In other words, the calculator display conveys information about the shopping cart attachment substrate. Preferably, the displayed advertising message is a slogan related to the advertisement on the shopping cart attachment, so that this display induces the shopper to read the advertisement. Placement of the slogan on the calculator display according to the present invention makes it difficult for the shopper to ignore the advertisement.

As is well known to those having skill in the art, a calculator typically includes a display, keyboard, microprocessor and memory. The memory is preferably a read only memory which contains the calculator control program for the microprocessor. According to the invention, this control program includes a program routine for causing the microprocessor to display the message related to the advertising on the display in response to the predetermined occurrence.

It will also be understood by those having skill in the art that the present invention may be employed in connection with freestanding desktop or pocket calculators which include advertising material thereon. For example, pocket calculators often include a hinged or foldable case or housing and may be provided as a promotional item with a company logo or other advertisement on the case. According to the present invention, the calculator is programmed to display a message related to the advertising contained thereon in response to a predetermined occurrence. It will be understood by those having skill in the art, however, that the present invention is especially useful in connection with a shopping cart attachment because the shopper is capable of immediately responding to the advertisement by purchasing the goods or services advertised.

DESCRIPTION OF THE PREFERRED EMBODIMENT

The present invention now will be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Figure 1:
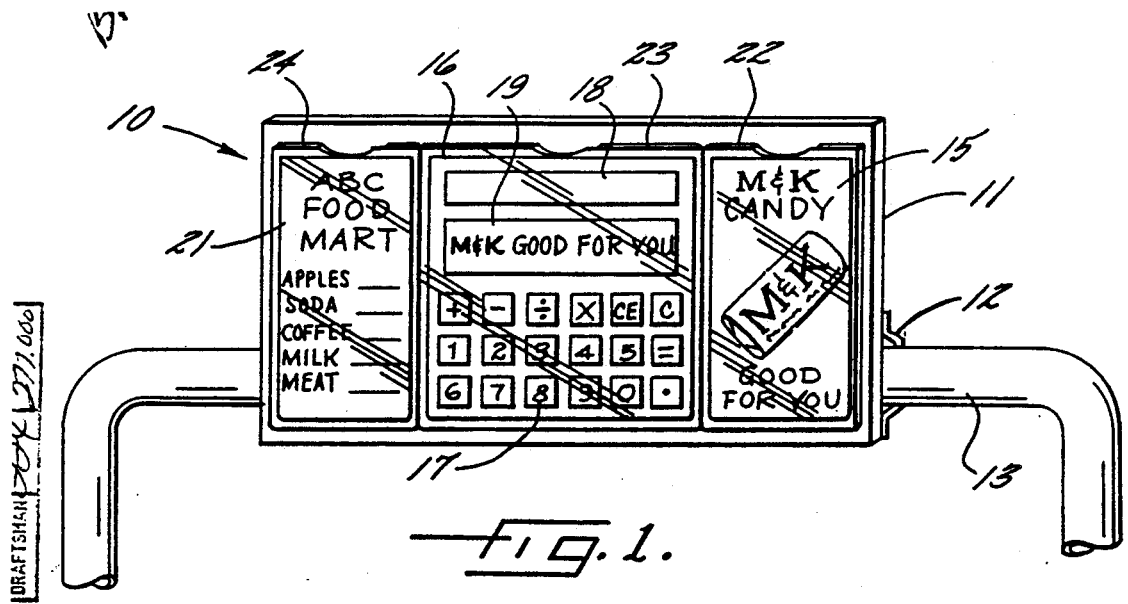
FIG. 1 is a perspective view of a shopping cart attachment according to the present invention.

Referring now to FIG. 1, a perspective view of a shopping cart attachment according to the present invention is illustrated. Shopping cart attachment 10 includes a substrate 11 which is preferably a plastic housing. One or more brackets 12 or other suitable means for attaching the substrate 11 to shopping cart 13 is also provided. Brackets 12 preferably provide a theft-proof attachment to prevent the shopping cart attachment 10 from being removed from shopping cart 13 without authorization. Brackets 12 may also provide for pivoting or adjusting the position of shopping cart attachment 10, to accommodate shoppers of different heights.

Substrate 11 includes three areas. The right area includes an advertisement 15. In FIG. 1 an advertisement for "M+K Candy" is shown. The center area includes a calculator 16. The calculator includes a keyboard 17 having a set of standard calculator keys, an optional solar cell 18 for providing electrical power to the calculator and a display 19, preferably an alphanumeric light emitting diode (LED) or liquid crystal display (LCD). As illustrated in FIG. 1, the display is adapted to display an advertising slogan ("M&K—Good For You!") related to the advertisement 15. Shopping cart attachment 10 may also include an optional left area 21, which may include a store directory or list of items on sale.

It will be understood by those, having skill in the art that advertisement 15, calculator 16 and optional information area 21 may be molded within the substrate housing 11. Alternatively, housing 11 may include clear plastic or other receptacles 22, 23, and 24 for receiving advertisement 15, calculator 18 and information card 21, respectively.

Figure 2:
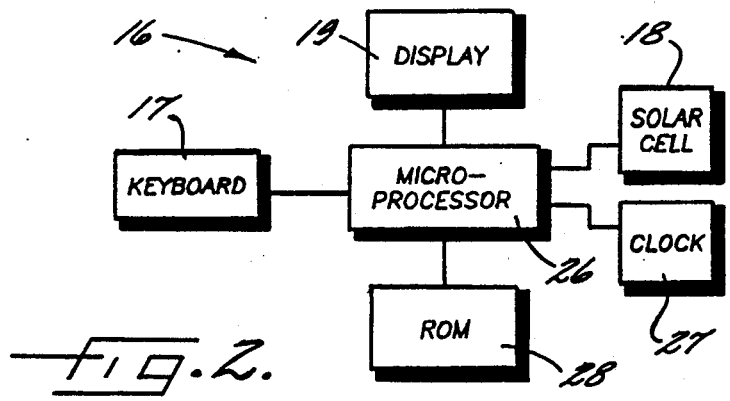
FIG. 2 is a block diagram of a calculator which may be employed in the shopping cart attachment of FIG. 1.

Referring now to FIG. 2, a block diagram of calculator 16 is illustrated. The design of calculator 16 is well known to those having skill in the art, and except to the extent that this design is modified according to the present invention, need not be described in detail. Calculator 16 includes electrically interconnected microprocessor 26, keyboard 17, display 19 and optional solar cell 18. A clock 27 provides the timing control for microprocessor 26. A memory, preferably a read-only memory (ROM) 28 stores the control program for operating the microprocessor 26. ROM 28 may be removably mounted to allow replacement hereto when a new advertising slogan is to be displayed. It will be understood by those having skill in the art that the components of FIG. 16 may be formed on a plurality of semiconductor substrates and mounted on a printed circuit board or card, or may be integrated into a single semiconductor substrate.

Figure 3:
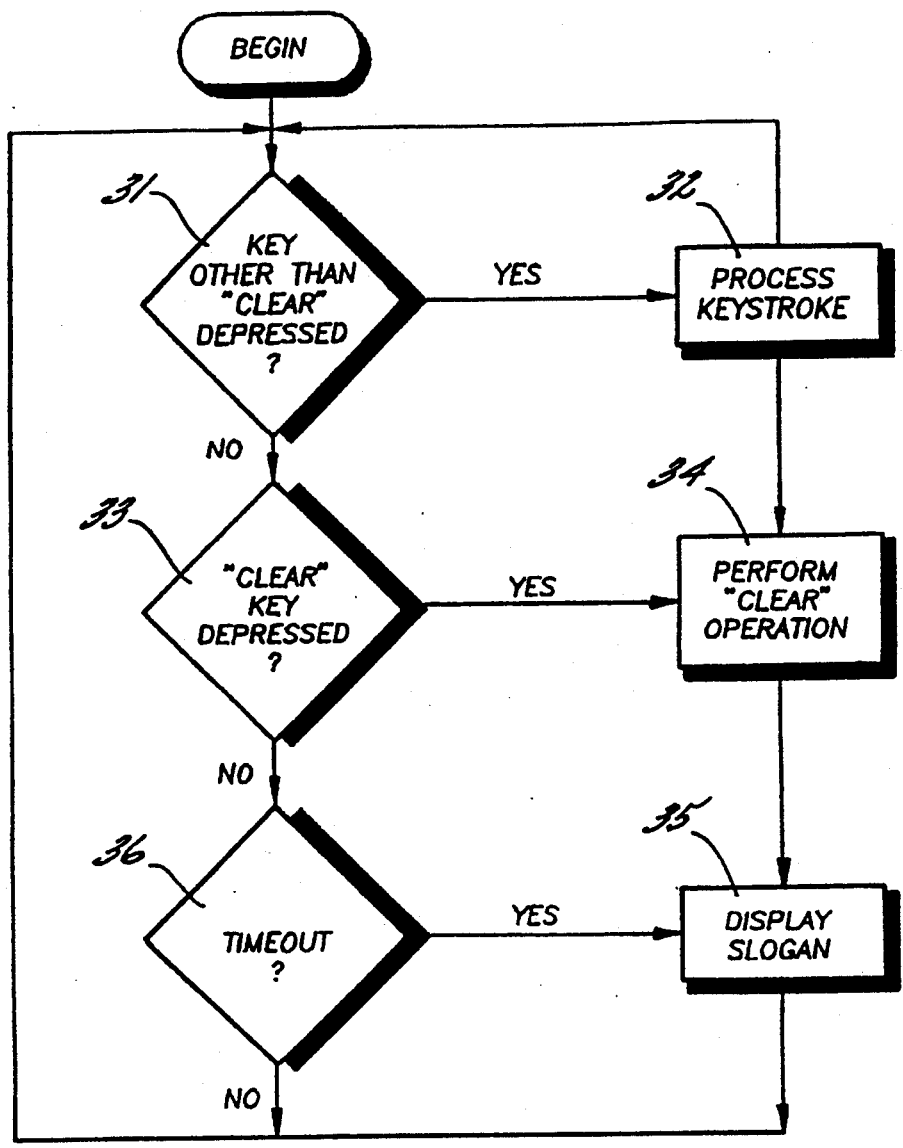
FIG. 3 is a flow chart representation of the operations performed by the calculator of FIG. 2 according to the present invention.

Referring now to FIG. 3, a flow chart representation of the operation of calculator 16 according to the present invention is illustrated. It will be understood by those having skill in the art that other operations (not illustrated) are typically performed by calculator 16 in order to perform standard arithmetic operations. It will also be understood by those having skill in the art that the flow chart of FIG. 3 causes the microprocessor to display the advertising slogan when either the calculator CLEAR key is depressed or a predetermined timeout has expired without any keys being depressed. However, the calculator may be controlled to display the advertising slogan in response to a key other than the CLEAR key being depressed and/or in response to another key not being depressed for a predetermined time. Other predetermined occurrences which are unrelated to key depressions, or lack thereof, may also trigger the advertising display.

Referring again to FIG. 3, operation begins when the microprocessor senses that a key other than the CLEAR key is depressed, at block 31. If a key other than the CLEAR key is depressed, the keystroke is processed at block 32 by performing a numerical or other calculator operation as required. If the CLEAR key is depressed (block 33), then the calculator first performs the CLEAR operation at block 34 and then displays the advertising slogan on display 19 at block 35. On the other hand, if the CLEAR key is not depressed, then the microprocessor checks for expiration of a predetermined timeout, for example thirty seconds, at block 36. If the timeout has expired, the advertising slogan is displayed (block 35). On the other hand, if the timeout has not yet expired, keyboard monitoring continues.

Figure 4:
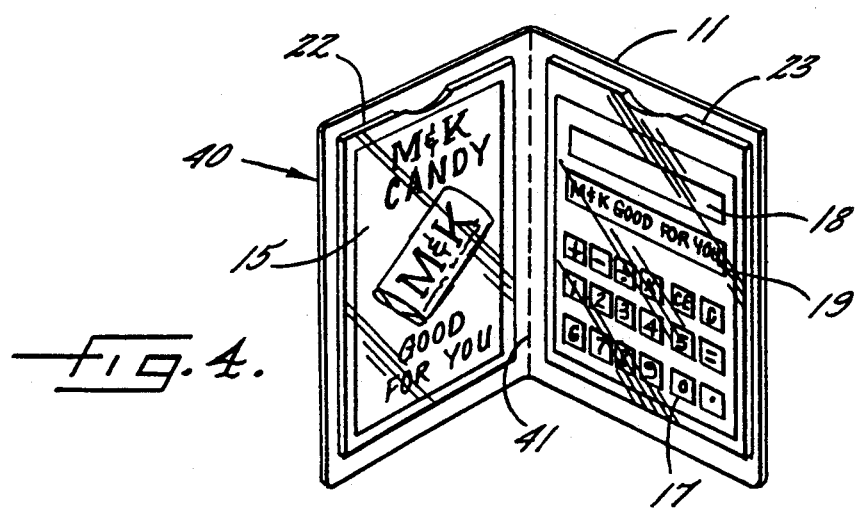
FIG. 4 is a perspective view of a pocket calculator according to the present invention.

Referring now to FIG. 4, a pocket calculator according to the present invention, will now be described. Pocket calculators are often sold or provided as promotional items in connection with advertising. Referring to FIG. 4, calculator 40 includes a housing 11 which may be foldable along line 41. The housing includes an advertisement 15, optional solar cell 18, display 19 and keyboard 17.

In the embodiment of FIG. 4, a packaged calculator is mounted in receptacle 23 and advertisement 15 is mounted in receptacle 22. However, it will be understood by those having skill in the art that the display 19, keyboard 17, solar cell 18, advertisement 15, and other components not shown may be encapsulated in a foldable housing wherein the advertisement 15 may form the cover of the housing. The internal design and operation of the calculator of FIG. 4 is as illustrated in FIGS. 2 and 3. A desktop calculator may similarly be provided.

In the drawings and specification, there have been disclosed typical preferred embodiments of the invention and, although specific terms are employed, they are used in a generic and descriptive sense only and not for purposes of limitation, the scope of the invention being set forth in the following claims.

That which we claim is:

1. A shopping cart attachment comprising:
a substrate; and
means for attaching said substrate to a shopping cart;
said substrate including an advertisement and a calculator, said calculator comprising an electrically interconnected microprocessor, keyboard and display, said calculator being adapted to display a message related to said advertisement on said display, in response to a predetermined occurrence.

2. The shopping cart attachment of claim 1 wherein said keyboard comprises a plurality of keys, and wherein said predetermined occurrence comprises depression of a key.

3. The shopping cart attachment of claim 1 wherein said keyboard includes a CLEAR key, and wherein said predetermined occurrence comprises depression of the CLEAR key.

4. The shopping cart attachment of claim 1 wherein said keyboard comprises a plurality of keys, and wherein said predetermined occurrence comprises expiration of a predetermined time during which none of said plurality of keys are depressed.

5. The shopping cart attachment of claim 1 wherein said keyboard comprises a plurality of keys, and wherein said predetermined occurrence comprises expiration of a predetermined time during which a predetermined one of said keys is not depressed.

6. The shopping cart attachment of claim 1 wherein said message comprises an advertising slogan related to said advertisement.

7. The shopping cart attachment of claim 1 wherein said display comprises an alphanumeric display.

8. The shopping cart attachment of claim 1 wherein said calculator further comprises a memory having a control program therein for controlling said calculator, said control program including a program routine for causing said microprocessor to display said message related to said advertisement on said display in response to the predetermined occurrence.

9. The shopping cart attachment of claim 1 wherein said calculator further comprises a solar cell, electrically connected to said microprocessor, for providing electrical power to said calculator.

10. The shopping cart attachment of claim 1 wherein said substrate comprises a plastic housing.

11. The shopping cart attachment of claim 1 wherein said attaching means comprises a bracket.

12. The shopping cart attachment of claim 1 wherein said substrate includes first and second receptacles thereon, said first receptacle being adapted for holding said advertisement, and said second receptacle being adapted for holding said calculator.

* * * * *